Patented Jan. 18, 1949

2,459,631

UNITED STATES PATENT OFFICE 2,459,631

TRAIN-LINE CONTROL SYSTEM

William F. Eames, Westfield, N. J., assignor to Westinghouse Electric Corporation, East Pittsburgh, Pa., a corporation of Pennsylvania Application June 15, 1946, Serial No. 676,869

7 Claims. (Cl. 171—97)

My invention relates generally to control systems, and more particularly to train-line control systems.

At the present time railway passenger cars are being equipped with lights, heating and air conditioning systems which are supplied with power from engine-driven generator power plants, one of which is on each car. If the power plant on one car fails, it is necessary to secure power from an adjacent car for temporary operation. This requires a removable connector between cars to connect the train-line wires which extend through the cars.

The jumpers between cars may or may not be installed while the train is in the yards. If they are not, it is necessary to install the jumper on the road when the emergency occurs. Some one of the train's crew performs this function and there must not be any hazard to the trainman.

An object of my invention is to provide a train-line system in which the jumpers may be installed without becoming energized.

Another object of my invention is to provide a train-line system in which the jumpers are automatically energized when the power plant on a car fails.

A further object of my invention is to prevent more than one dead car being connected to a live car in a train.

Still another object of my invention is to provide an alternating-current train-line control system.

A still further object of my invention is to provide a train-line control system which requires a relatively small number of control wires.

A more general object of my invention is to provide a train-line control system which shall be simple and efficient in operation and which may be economically manufactured and installed.

Other objects of my invention will be explained fully hereinafter or will be apparent to those skilled in the art.

In accordance with one embodiment of my invention, train-line power wires extend the length of each car of a train and terminate in a jack at each end of the car. Connectors or jumpers are provided for making connections between cars. The generator on each car is automatically disconnected from the power wires in case of failure and the power wires are connected through contactors and the jumpers to the generator on an adjacent car. The contactors are so interlocked that a generator cannot supply power to more than two cars at a time.

Figure 1:
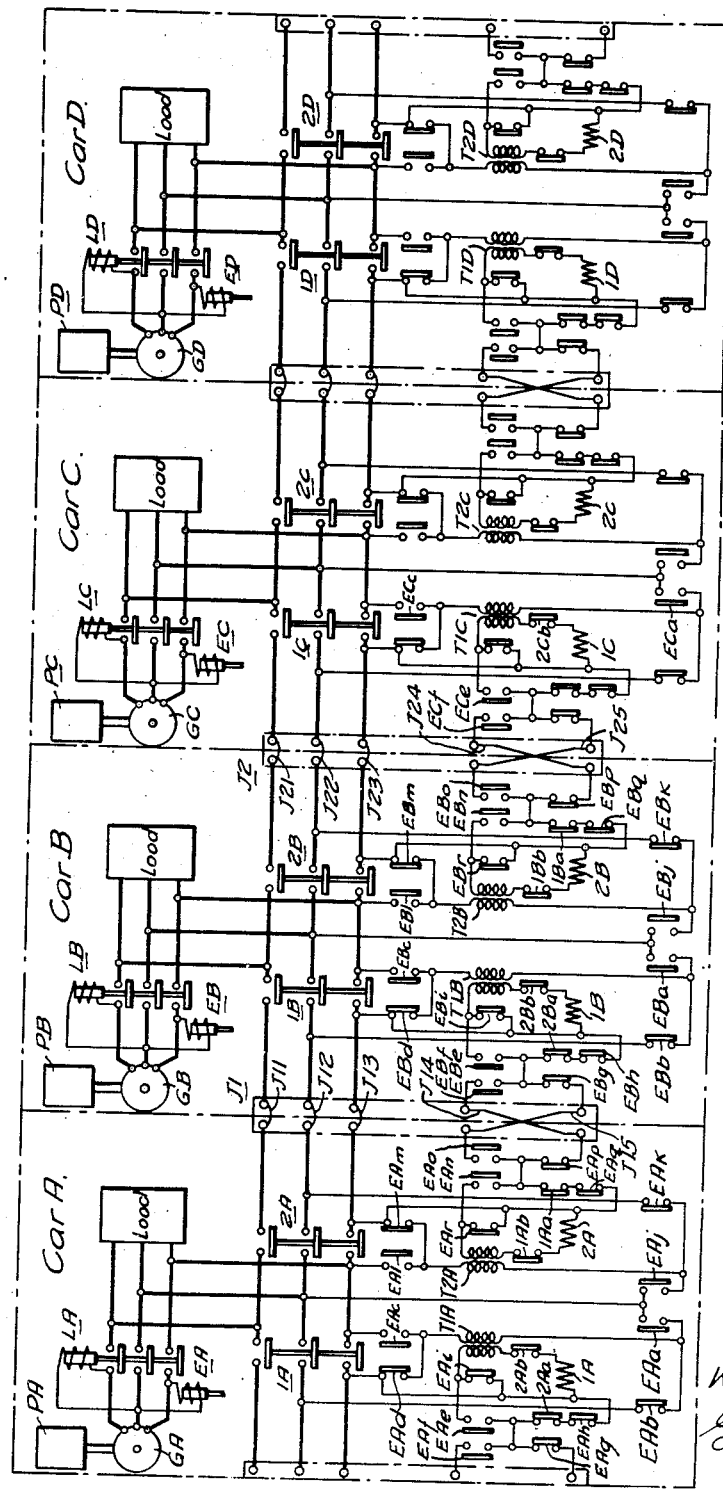
Figure 2:
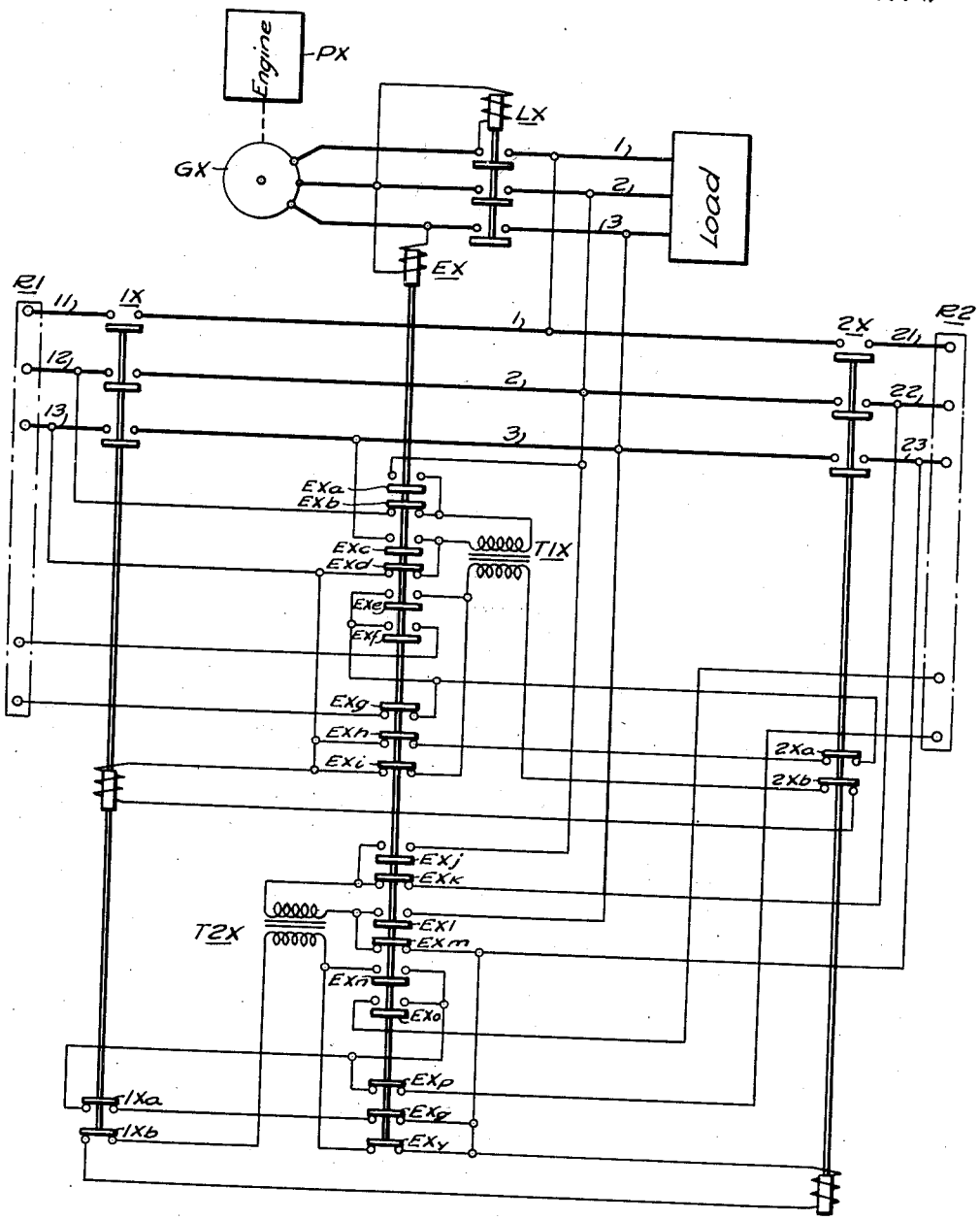

For a fuller understanding of the nature and objects of my invention, reference may be had to the following detailed description, taken in conjunction with the accompanying drawings, in which:

Figure 1 is a diagrammatic view of a multicar train-line control system embodying the principal features of my invention, and Fig. 2 is a detail diagrammatic view of the apparatus and circuits for one car of a train.

Referring to Fig. 2 of the drawings, the equipment provided for each car of a train comprises a generator GX which may be driven by a suitable prime mover PX, a three-pole switch LX for connecting the generator to load circuit conductors 1, 2 and 3, a three-pole switch IX for connecting the load circuit conductors 1, 2 and 3 to train-line conductors 11, 12 and 13, respectively, at one end of the car, a similar switch 2X for connecting the load circuit conductors to train-line conductors 21, 22 and 23 at the other end of the car, a sequence relay EX responsive to the voltage of the generator GX, a transformer T1X for energizing the actuating coil of the switch IX and a transformer T2X for energizing the actuating coil of the switch 2X. The train-line conductors 11, 12 and 13 terminate in a receptacle R1 at one end of the car and the conductors 21, 22 and 23 terminate in a receptacle R2 at the other end of the car.

As shown in Fig. 1, the receptacles on the adjoining ends of the cars of a train may be connected by jumper connectors J1 and J2 having wires J11, J12 and J13 and J21, J22 and J23, respectively, for the main train-line power conductors. Additional wires J14, J15, J24 and J25 are also provided in the jumper connectors for train-line control circuits. The receptacles and connectors are so constructed that they can be connected in only one position. However, they are symmetrical so that it does not matter which end of a connector is used or which end of a car is adjacent to the next car ahead.

The equipment is so connected that when the engine and the generator on each car of a train are operating properly, the load circuit for each car is supplied with power from its own generator. If the generator voltage fails on a car the load circuit is automatically disconnected from the generator on that car and connected to the generator on an adjacent car. However, no one generator can supply power to more than two cars at a time, thereby preventing overloading any generator. If desired, the load on each one of two cross-connected cars may be reduced by one half so that the generator supplying both cars will still be carrying its normal load.

Thus, assuming that car B becomes dead while connected between two live cars A and C, the switch LB opens to disconnect the load circuit from the generator GB, since the actuating coil of this switch is connected across one phase of the generator. The actuating coil of the relay EB, which is connected across one phase of the generator, is also deenergized and the contact members of this relay drop to their lowermost position. When the relay EB drops out, circuits are established for energizing the actuating coils of switches 2A on car A and IC on car C. Depending upon which closes first, there is also a circuit established to energize the actuating coil of either switch IB or switch 2B. These two switches are electrically interlocked to prevent both from being closed at the same time. They may also be mechanically interlocked as an additional safeguard.

The actuating coil of the switch 2A is energized by a transformer T2A, the primary winding of which is connected across one phase of the load circuit of Car A through contact members EAj and EAl of the relay EA. The secondary winding of the transformer is connected across the actuating coil of the switch 2A through a circuit which extends from one terminal of the secondary winding through contact member IAb of the switch IA, the actuating coil of the switch 2A, the jumper J13, contact members EBh of the relay EB, an interlock 2Ba on switch 2B, contact members EBg, the jumper J15, contact members EAo and EAn of the relay EA to the other terminal of the secondary winding of the transformer T2A.

The actuating coil of the switch IC is energized in a similar manner by the transformer TIC, the primary winding of which is connected across power conductors of the load circuit for the car C through contact members ECa and ECc of the relay EC. The circuit for the coil of the switch IC may be traced from one terminal of the secondary winding of the transformer TIC through an interlock 2Cb, the coil IC, jumper J23, contact members EBq, interlock IBa, contact members EBp, jumper J24, and contact members ECf and ECe to the other terminal of the secondary winding of the transformer TIC.

Assuming that the switch 2A closed first and that the switch IB followed, the load circuit for the car B is connected to the generator on the car A through the switch IB, the jumper connector JI, the switch 2A and the switch LA. The primary winding of the transformer TIB is connected across the power conductors on the car B energized by the closing of the switch 2A through contact members EBb and EBd of the relay EB. The energizing circuit for the actuating coil of the switch IB may be traced from one terminal of the secondary winding of the transformer TIB, through contact members EBi of the relay EB, the actuating coil IB and an interlock 2Bb of the switch 2B to the other terminal of the secondary winding of the transformer.

Since the switch IB closed first, the actuating coil of the switch 2B is prevented from being energized because the interlock IBb is open. Likewise the energizing circuit for the actuating coil of the switch IC is opened by the interlock IBa. Thus, the switch IC remains open, thereby permitting the generator on the car C to be available for supplying power to the car D in the event of failure of the generator on the car D. The car C would be connected to the car D through switches 2C and ID in the manner herein described with reference to cars A and B.

If the train-line jumpers had not been connected when the cars of the train were coupled, it would be necessary to connect a jumper between a dead car and a live car in order to supply power to the dead car. This can be done with safety to the operator, since it makes no difference if the jumper is plugged in on the live car or the dead car first, as there is no high voltage on a main connector until both ends are plugged in, at which time the sequence occurs automatically to cross connect the two cars. The voltage on the connectors for the control wires is stepped down by the transformers, thereby making them safe to handle while being inserted into the receptacles.

By making the prongs for the control wires of the connectors slightly shorter than the prongs for the power wires, the control circuits will be interrupted first when the jumpers are removed from the receptacle. In this manner, the switches which isolate the load circuit from the train-line jumpers are opened prior to the separation of the contact members of the jumpers and the receptacle, thereby preventing arcing on these contact members.

From the foregoing description, it is apparent that I have provided a control system which functions to automatically connect the generator on one car of a train to the load circuit of an adjacent car in the event of failure of the power supply for the adjacent car. Furthermore, the generator is prevented from supplying power to more than two cars at a time, thereby avoiding overloading the generator. The system may be utilized on a train containing any number of cars which may be connected in the train in any desired location, it being unnecessary for the cars to be connected in any particular order.

Since numerous changes may be made in the above described construction and different embodiments of the invention may be made without departing from the spirit and scope thereof, it is intended that all matter contained in the foregoing description, or shown in the accompanying drawing shall be interpreted as illustrative and not in a limiting sense.

I claim as my invention:

1. In a train-line control system, in combination, a plurality of cars, a generator on each car, means for driving the generators, a load circuit for each car, switching means for connecting each generator to its load circuit, means reponsive to the generator voltage for controlling the operation of said switching means, a plurality of train-line conductors on each car, jumpers interconnecting the conductors on adjacent cars, additional switching means for connecting the load circuit for each car to the train-line conductors, and relay means responsive to the generator voltage for so controlling the operation of said additional switching means that the load circuit on a car is connected to the generator on one of the adjacent cars through said conductors and said jumpers upon failure of the generator voltage on said car.

2. In a train-line control system, in combination, a plurality of cars, a generator on each car, means for driving the generators, a load circuit for each car, switching means for connecting each generator to its load circuit, a plurality of train-line conductors on each car, jumpers interconnecting the conductors on adjacent cars, additional switching means for connecting the load circuit for each car to the train-line conductors, and means responsive to the generator voltage for so controlling the operation of said additional switching means that the load circuit on a car is connected to the generator on one of the adjacent cars through said conductors and said jumpers upon failure of the generator voltage on said car, said additional switching means being actuated by power received through said train-line conductors.

3. In a train-line control system, in combination, a plurality of cars, a generator on each car, means for driving the generators, a load circuit for each car, switching means for connecting each generator to its load circuit, means responsive to the generator voltage for controlling the operation of said switching means, a plurality of train-line conductors on each car, jumpers interconnecting the conductors on adjacent cars, additional switching means for connecting the load circuit for each car to the train-line conductors, relay means responsive to the generator voltage for so controlling the operation of said additional switching means that the load circuit on a car is connected to the generator on one of the adjacent cars through said conductors and said jumpers upon failure of the generator voltage on said car, and interlocking means on the additional switching means cooperating with said relay means in controlling the operation of said additional switching means to prevent a generator from supplying power to more than two cars at a time, said additional switching means being actuated by power received through said train-line conductors.

4. In a train-line control system, in combination, a plurality of cars, a generator on each car, means for driving the generators, a load circuit for each car, switching means for connecting each generator to its load circuit, means responsive to the generator voltage for controlling the operation of said switching means, a plurality of train-line conductors on each car, jumpers interconnecting the conductors on adjacent cars, additional switching means for connecting the load circuit for each car to the train-line conductors, relay means responsive to the generator voltage for so controlling the operation of said additional switching means that the load circuit on a car is connected to the generator on one of the adjacent cars through said conductors and said jumpers upon failure of the generator voltage on said car, and interlocking means on the additional switching means for preventing more than two load circuits being connected to a generator at the same time.

5. In a train-line control system, in combination, a plurality of cars, a generator on each car, means for driving the generators, a load circuit for each car, switching means for connecting each generator to its load circuit, a plurality of train-line conductors on each car, jumpers interconnecting the conductors on adjacent cars, additional switching means for connecting the load circuit for each car to the train-line conductors, and means on each car responsive to the generator voltage for so controlling the operation of said switching means that the load circuit on a car is connected to the generator on an adjacent car through said train-line conductors and said jumpers upon failure of the generator voltage on said car.

6. In a train-line control system, in combination, a plurality of cars, a generator on each car, means for driving the generators, a load circuit for each car, switching means for connecting each generator to its load circuit, a plurality of train-line conductors on each car, jumpers interconnecting the conductors on adjacent cars, additional switching means for connecting the load circuit for each car to the train-line conductors, and means on each car responsive to the generator voltage for so controlling the operation of said switching means that the load circuit on a car is connected to the generator on an adjacent car through said train-line conductors and said jumpers upon failure of the generator voltage on said car, said additional switching means being operated by power received through said train-line conductors.

7. In a train-line control system, in combination, a plurality of cars, a generator on each car, means for driving the generators, a load circuit for each car, switching means for connecting each generator to its load circuit, a plurality of train-line conductors on each car, jumpers interconnecting the conductors on adjacent cars, additional switching means for connecting the load circuit for each car to the train-line conductors, means on each car responsive to the generator voltage for so controlling the operation of said switching means that the load circuit on a car is connected to the generator on an adjacent car through said train-line conductors and said jumpers upon failure of the generator voltage on said car, said additional switching means being operated by power received through said train-line conductors, and interlocking means on said additional switching means for preventing a generator from supplying power to more than two cars at a time.

WILLIAM F. EAMES.

REFERENCES CITED

The following references are of record in the file of this patent:

UNITED STATES PATENTS

| Number | Name | Date |
| --- | --- | --- |
| 1,528,045 | Butcher | Mar. 3, 1925 |
| 1,786,310 | McCullough | Dec. 23, 1930 |